United States Patent [19]

Braeger

[11] 4,222,152
[45] Sep. 16, 1980

[54] APPARATUS FOR THE SKINNING OF FISH FILLETS

[75] Inventor: Horst Braeger, Lübeck, Fed. Rep. of Germany

[73] Assignee: Nordischer Maschinenbau Rud. Baader GmbH & Co KG, Lubeck, Fed. Rep. of Germany

[21] Appl. No.: 964,450

[22] Filed: Nov. 29, 1978

[51] Int. Cl.³ .............................................. A22C 25/17
[52] U.S. Cl. ....................................................... 17/62
[58] Field of Search ................... 99/588, 589; 17/21, 17/62

[56] References Cited
U.S. PATENT DOCUMENTS

| | | | |
|---|---|---|---|
| 2,477,289 | 7/1949 | De Moss | 17/21 |
| 3,513,893 | 5/1970 | Townsend | 99/589 |
| 3,613,154 | 10/1971 | Townsend | 99/589 X |
| 3,733,997 | 5/1973 | Beasley | 99/588 X |

FOREIGN PATENT DOCUMENTS 64498 2/1942 Norway ........................ 99/589

Primary Examiner—Willie G. Abercrombie
Attorney, Agent, or Firm—Edward F. Levy

[57] ABSTRACT

An apparatus for skinning fish fillets comprises a rotatable skinning roller, conveyor means for advancing the fillets to the skinning roller, and a skinning knife provided with a cutting edge at a fixed distance from and a presser face equi-spaced from the periphery of the skinning roller. The periphery of the skinning roller is provided with lands for transporting the fillet and supporting it at the skin side thereof and grooves comparatively narrow with respect to the lands and separating the latter.

13 Claims, 1 Drawing Figure

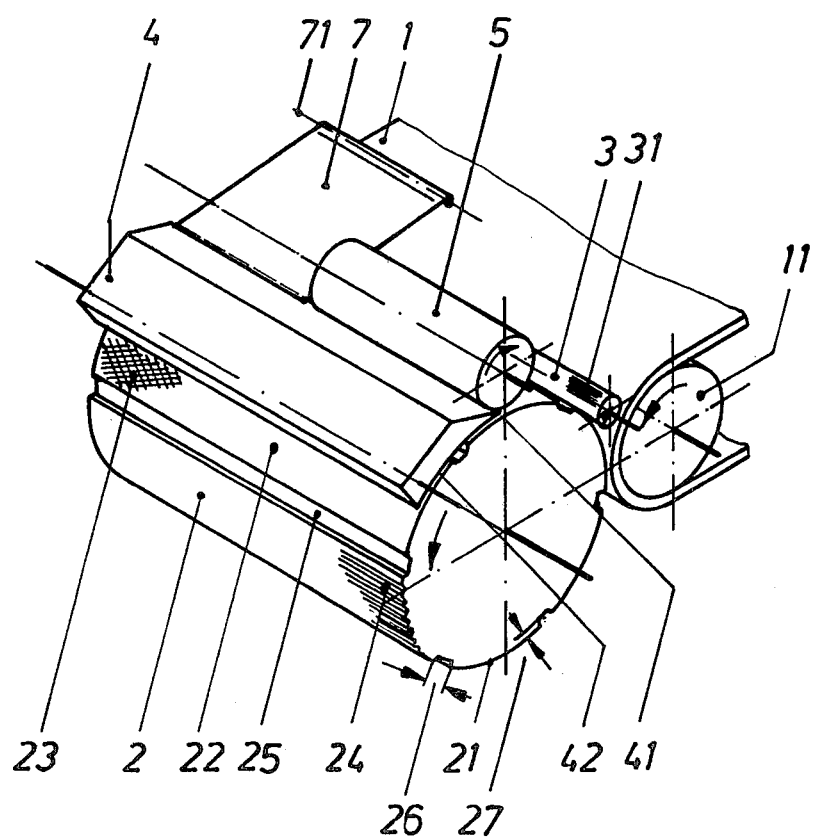

APPARATUS FOR THE SKINNING OF FISH FILLETS

BACKGROUND OF THE INVENTION

1. Field of the Invention

The invention relates to an apparatus for skinning fish fillets, comprising a rotatable skinning roller, conveyor means for advancing the fillet to the skinning roller and a skinning knife provided with a cutting edge at a fixed distance from and a presser face equi-spaced from the periphery of the skinning roller.

2. Description of Prior Art

Known apparatus for skinning a fish fillet comprises skinning rollers which are provided on their periphery with a uniform arrangement of teeth in which the faces of the teeth lying in the circumference of the roller are very narrow and the gaps between the teeth relatively large and deep. To improve the running-in or entry of the skin of the leadng fish fillet end under the cutting edge of the skinning knife, according to DE-OS No. 25 23 752 the skinning knife is provided, at its cutting edge, with a surface directed away from and against the rotational direcion of the periphery of the skinning roller.

Such apparatus has a number of advantages: They have a simple construction, the drive for an oscillating skinning knife can be dispensed with and they make the removal of the skin possible without loss of a tip of flesh at the leading end of the fish fillet. However, they also have disadvantages: The yield of fish flesh attainable with such apparatus is not satisfactory because the largest part of the gain in fish flesh attained by the non-loss of the flesh tip at the preceding end of the fish fillet gets lost due to the fact that a thicker layer of fish protein remains on the entire skin surface than is the case with skinning apparatus with a switchable skinning knife. This not only reduces the yield in fish meat, but also impairs the appearance and the consistency of the skinned fish fillets, because maintenance of the silver layer with the protective layer lying thereunder on the skin side of the fish fillet is only attainable with difficulty or is even not obtainable at all. A further important defect of such apparatus is that fillets of fish with thick and/or scaly skin cannot be skinned at all or at least not reliably, while the running-in of the skin below the cutting edge of the skinning knife is not properly attained even with a skinning knife (according to DE-OS No. 25 23 752) provided with a surface directed against the circulating direction of the skinning roller.

OBJECT OF INVENTION

It is one of the main objects of the present invention to avoid the disadvantages of said known skinning apparatus and to arrange the apparatus such that it enables the skinning at high yield of fish flesh by leading the fillet to be skinned so closely to the skinning knife that it is upset in front of the same and that even thick or scaly skin will run-in safely underneath the cutting edge of the skinning knife.

SUMMARY OF THE INVENTION

According to the present invention there is provided an apparatus for skinning fish fillets, comprising a rotatable skinning roller, conveyor means for advancing the fillet to the skinning roller, and a skinning knife provided with a cutting edge at a fixed distance from and a presser face equi-spaced from the periphery of the skinning roller, the periphery of the skinning roller being provided with lands for transporting the fillet and supporting it at the skin side thereof and with groove means comparatively narrow with respect to said lands and separating the latter. The main advantages thus achieved are that the skin is uniformly supported over the lands and that the yield in fish flesh is increased due to a uniform silver mirror being attainable on the fish fillet. Also the running-in of the skin of the preceding fish fillet end takes place securely and without delay with every kind of fish because it does not execute a vertically dancing motion which is caused by the teeth of the skinning roller of known apparatus, but lies flush on the lands of the skinning roller rotating under it so that thus the skin of the preceding end of the fish fillet is enabled to penetrate into one of the grooves and come below the cutting edge of the skinning knife.

The conveyor means may comprise an endless belt, and a rotatable transfer roller may be disposed between said belt and said skinning roller, each of these elements known per se.

The grooves may extend axially of the skinning roller. Thereby, the skinning roller can be easily manufactured.

The groove means may extend helically around the skinning roller. This enables, in the case of narrow grooves, the engagement length for the skin to be enlarged.

The groove means may well comprise helical grooves which cross one another. Thereby the number of the engagement locations of the skin may be increased.

The groove means be arranged in arrow shape. Thereby, the flush resting of the skin on the lands of the roller may be improved by the skin being outwardly stretched.

In order to make sure that for every fish fillet end arriving a groove is ready, the groove means may be so arranged that for any angular position of the skinning roller at least part of the groove means is disposed opposite the presser face.

Preferably the groove means may have a base which is narrower than the mouth and may have opposite side walls which taper towards each other from the mouth, the depth of the groove means preferably being less than the least width thereof. Thereby the space for the running-in of the skin lets itself be dimensioned adequately without side effects on the silver mirror taking place.

The lands of the skinning roller may be rough and the roughness may be produced mechanically, chemically or electrolytically. The roughness provides a co-efficient of friction adequate for the entrainment of the skin without endangering the yield of fish flesh.

The lands of the skinning roller may, however, also be provided with a fine toothing. Thereby, the skin of fish fillets with large skinning resistance can be conveyed securely.

In the case of an arrangement of a transfer roller this may be provided with a fine toothing. Thereby further quietening of the leading end of the fish fillet before its running-in into the skinning knife is attainable.

A known per se presser roller may be disposed in proximity of the cutting edge of the skinning knife. Thereby, automatic checking or alignment of the preceding end of the fish fillet and consequently the secure running-in thereof may be attained.

Advantageously a guide face may be arranged above the skinning roller and at an acute angle with a tangent line drawn from the cutting edge of the skinning knife to the circumference of the skinning roller, said guide face having an edge adjacent the skinning roller which passes slightly across the cutting edge of the skining knife, lies on the back of the skinning knife and is arranged to yield in an upward direction. This enables the positive feeding and running-in of the leading fillet tips of the rather stiff fillets even in case of rigor mortis into one of the grooves between the lands and the safe separation of the fibres between skin and fillets at the end of the skinning process.

To increase the run-in effect of very stiff fillets and to improve the skinning process even further, the guide face may be pivotable about an axis parallel to the axis of the skinning roller and perform an oscillating movement of small amplitude in the conveying direction of the fish fillets.

The trailing flanks of said groove means can be backwardly inclined opposite to the direction of rotation of the skinning roller. Thereby the safe initial cutting is further improved and the danger of patches of skin remaining on the flesh avoided.

BRIEF DESCRIPTION OF THE DRAWING

An embodiment of the present invention will now be more particularly described by way of example and with reference to the accompanying drawing, the single FIGURE of which shows an axonometric illustration of two differing versions of an apparatus embodying the present invention, the one version to the right hand side of the feeding and conveying direction showing a guide face, and the other one to the left incorporating a pressure roller.

DESCRIPTION OF THE PREFERRED EMBODIMENTS

A deflecting roller 11, a transfer roller 3 and a skinning roller 2 are jornalled in a frame (not shown) and driven counter-clockwise as shown by the arrows on the periphery of the rollers. An endless feed belt 1 is looped around the deflecting roller 11 and tensioned by a tensioning roller (not shown). The transfer roller 3 and the skinning roller 2 each run at a higher peripheral speed than the feed belt 1. A skinning knife 4 is arranged fast with the frame above the upper half of the skinning roller 2 and has a presser face 42 equidistantly from the peripheral surface 21 of the skiinning roller 2. The gap between the cutting edge 41 or the presser face 42 and the peripheral surface 21 of the skinning roller 2 is a few tenths of a millimeter. Advantageously, the skinning knife 4 is so arranged that it can deviate away from the periphery of the skinning roller 2 against strong spring pressure. Arranged above the cutting edge 41 of the skinning knife 4 there may be an integral or multi-part presser roller 5, which is driven in the direction shown by the arrow on the periphery of the presser roller and which is arranged to be deviatable against a spring force. However, instead of this pressure roller 5 there may be provided a guide face 7 pivotable about an axis 71 parallel to the axis of the skinning roller 2.

The cylindrical peripheral surface 21 of the skinning roller 2 is divided by axial grooves 25 into lands 22 which possess roughenings of small radial depth. The rough surface may be provided by for example crossed knurls 23 or fine toothing 24 which serve to entrain the skin along the presser face 42 of the skinning knife 4.

The grooves 25 have the shape of non-uniform trapeziums, the depth 27 of which amounts to only a fraction of their width 26, and the trailing flanks of which may be inclined oppositely to the direction of the skinning roller 2. The width of the grooves may be about 5 millimeters and their depth about 1.5 millimeters. The surface of the transfer roller 3 is provided with a fine toothing and also the surface of the presser roller 5 is advantageously provided with a profiling (not shown) of small depth.

The apparatus operates as follows:

A fish fillet laid with its skin side on the feed belt 1 is fed by the feed belt 1 with its tail end forward to the deflecting location above the deflecting roller 11, where the transfer roller 3 guides the tail tip onto the peripheral surface 21 of the skinning roller 2. The fine toothing 31 of the transfer roller 3 is thus in a position to raise the fillet end from the feed belt 1 but prevents excitation of the fish fillet end into a vertical flapping motion. The skinning roller 2 rotates more rapidy than the fed tail end of the fish fillet and rotates with its lands 22 and grooves 25 below the skin side of the fish fillet until the leading end thereof has reached the cutting edge 41 of the skinning knife 4. The merely low roughness of the lands 22 of the skinning roller 2 causes the skin to rest flush on the peripheral surface 21. In consequence thereof, the skin of the tail end drops briefly into the grooves 25 respectively passing through below it. When the tail end of the fish fillet again penetrates with its skin into a groove 25 on reaching the cutting edge 41 of the skinning knife 4 wedging of the skin takes place instantaneously through the presser face 42 lying below the cutting edge 41 and enables the cutting edge 41 to penetrate between the skin and silver layer of the fish fillet and thereby to sever the fish fillet from the skin. This process is performed with great certainty when the fish fillet is conveyed forward spread out from the feed belt 1. The presser roller 5 disposed above the cutting edge 41 comes into effect particularly when irregularities are present in the position of the fish fillet.

The arrangement of a guide face 7 instead of the pressure roller 5 is advantageous when very stiff and rigid fillets are to be skinned. The skinning process may then be further improved by providing for an oscillation of the guide face in the conveying or feeding direction.

I claim:

1. An apparatus for skinning fish fillets, comprising a rotatable skinning roller, conveyor means for advancing the fillet to the skinning roller, and a skinning knife provided with a cutting edge at a fixed distance from and a presser face equi-spaced from the periphery of the skinning roller, wherein the periphery of the skinning roller is provided
    (a) with recess means distributed over the circumference of said skinning roller and extending from one end face of the latter to the opposite end face and
    (b) with lands enclosed between said recess means for transporting the fillet and supporting it at the skin side thereof, each of said lands, when measured in the direction of the circumference of said skinning roller, having a width which is a multiple of the width of each of said recess means.

2. An apparatus for skinning fish fillets, comprising a rotatable skinning roller, conveyor means for advancing the fillet to the skinning roller, and a skinning knife provided with a cutting edge at a fixed distance from and a presser face equi-spaced from the periphery of the skinning roller, wherein the periphery of the skinning roller is provided (a) with recess means distributed over the circumference of the skinning roller and extending axially of the skinning roller from one end face of the latter to the opposite end face and (b) with lands enclosed between said recess means for transporting the fillet and supporting it at the skin side thereof, each of said lands, when measured in the direction of the circumference of said skinning roller, having a width which is a multiple of the width of each of said recess means.

3. An apparatus as claimed in claim 1, wherein said recess means have the form of grooves.

4. An apparatus as claimed in claim 2, wherein said recess means have the form of grooves.

5. An apparatus as claimed in claim 1 or 2, wherein the conveyor means comprise an endless belt, and a rotatable transfer roller is disposed between said belt and said skinning roller, said transfer roller being provided with a fine toothing.

6. An apparatus as claimed in claims 1 or 2, wherein said recess means are so arranged that for any angular position of the skinning roller at least part of the recess means are disposed opposite the presser face.

7. An apparatus as claimed in claims 3 or 4, wherein said groove means have a base which is narrower than the mouth thereof, and opposite side walls which taper towards each other from said mouth, the depth of the groove means being less than the least width thereof.

8. An aparatus as claimed in claims 1 and 2, wherein the lands of the skinning roller are rough.

9. An aparatus as claims in claims 1 or 2, wherein the lands of the skinning roller are provided with a fine toothing.

10. An apparatus as claimed in claims 1 or 2, wherein a presser roller is disposed in proximity to the cutting edge of the skinning knife.

11. An apparatus as claimed in claim 1, wherein a guide face is arranged above the skinning roller and at an acute angle with a tangent line drawn from the cutting edge of the skinning knife to the circumference of the skinning roller, said guide face having an edge adjacent the skinning roller which slightly passes across the cutting edge of the skinning knife, lies on the back of the skinning knife and is arranged to yield in an upward direction.

12. An apparatus as claimed in claim 11, wherein said guide face is pivotable about an axis parallel to the axis of the skinning roller and performs an oscillating movement of small amplitude in the conveying direction of the fish fillets.

13. An apparatus as claimed in claims 1 or 2, wherein the trailing flanks of said recess means are backwardly inclined opposite to the direction of rotation of the skinning roller.

* * * * *